UNITED STATES PATENT OFFICE.

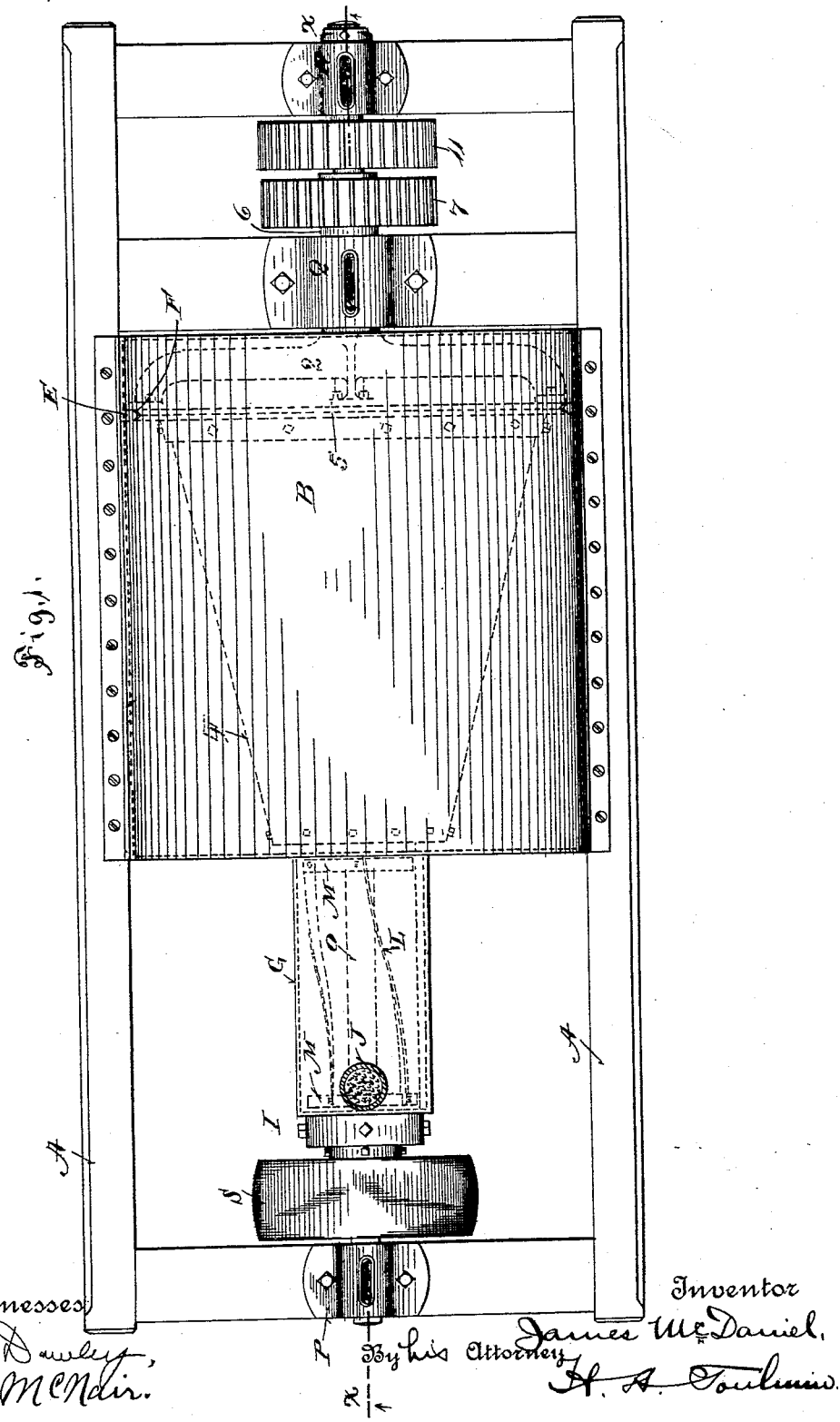

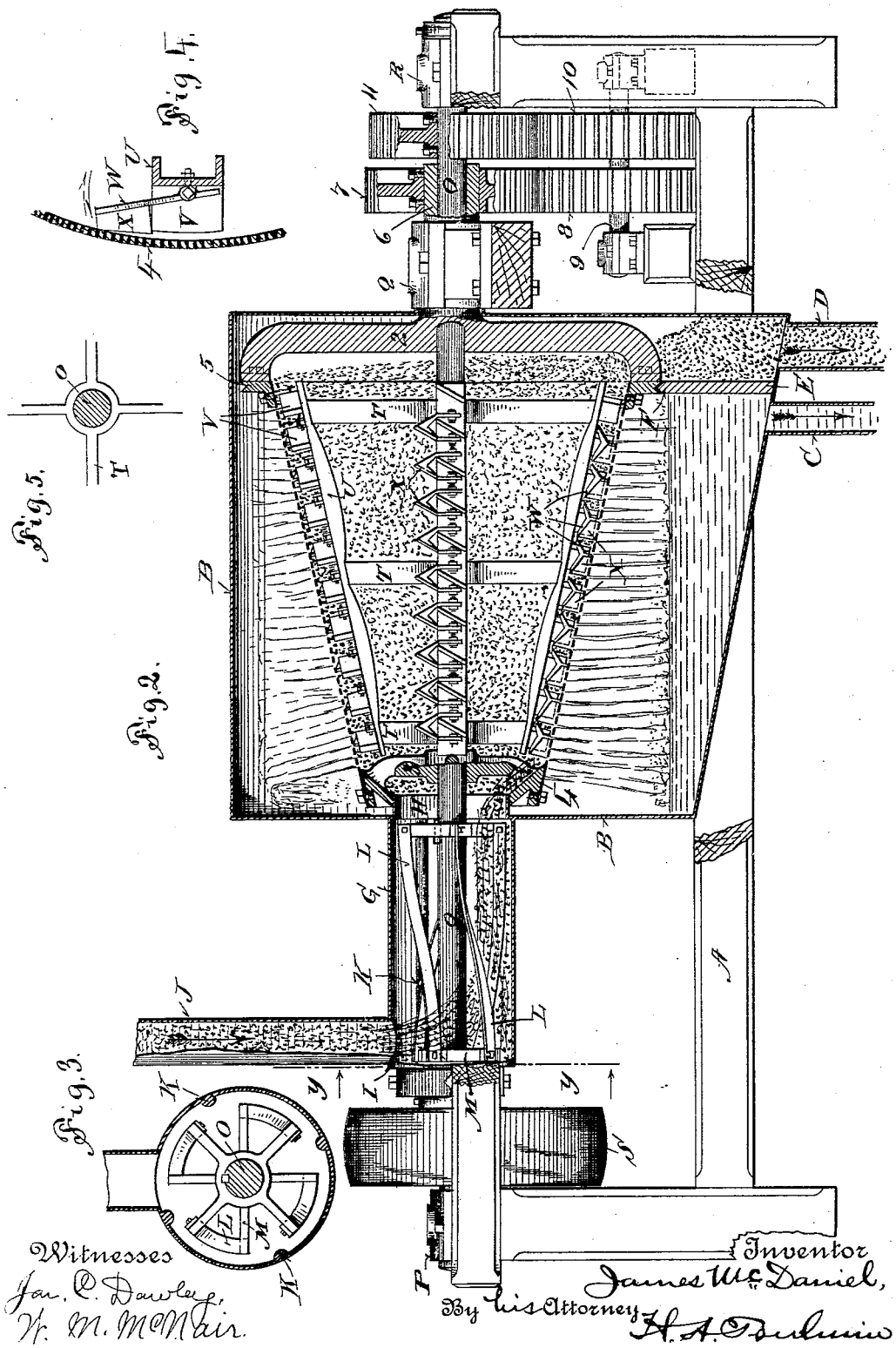

JAMES McDANIEL, OF MINNEAPOLIS, MINNESOTA.

WHEAT-WASHING MACHINE.

SPECIFICATION forming part of Letters Patent No. 573,686, dated December 22, 1896.

Application filed October 29, 1895. Serial No. 567,330. (No model.)

*To all whom it may concern:*

Be it known that I, JAMES McDANIEL, a citizen of the United States, residing at Minneapolis, in the county of Hennepin and State of Minnesota, have invented certain new and useful Improvements in Wheat-Washing Machines, of which the following is a specification, reference being had therein to the accompanying drawings.

This invention relates to certain new and useful improvements in wheat-washing machines.

The general object of my invention is to provide a machine which will thoroughly cleanse wheat by washing it, and which will separate the water from the wheat during the process of washing, and will also not break or injure the wheat. This general object is carried out by a machine consisting, essentially, of a feeding-drum, revolving feeding-beaters, and a perforated straining-drum with revolving conveyers, and preferably, also, yielding wipers.

A further feature consists in rotating the perforated straining-drum and the revolving conveyers in the same direction, but at different speeds, one of them traveling at a greater speed.

The invention further consists in certain details to be hereinafter particularly described, and pointed out in the claims.

In the accompanying drawings, on which like reference letters and numerals indicate corresponding parts, Figure 1 is a plan view of my machine entire; Fig. 2, a longitudinal vertical sectional view on the line $x\,x$ of Fig. 1; Fig. 3, a transverse sectional view on the line $y\,y$ of Fig. 2, looking in the direction of the arrow; Fig. 4, a detail cross-sectional view of the straining-drum and one of the conveyers and a side view of one of the yielding wipers, and Fig. 5 a detail section of the main shaft and elevation of one of the spiders for the conveyers.

The letter A designates a stout frame constructed to form a suitable support for the machine proper. A water-tight casing B is suitably supported by the frame and provided with a water-outlet C, a wheat-outlet D, and a partition E, the upper edge of the latter being V-shaped, as shown at F, to form a joint with an annulus carried by the revolving spiders, as hereinafter specified, to prevent the water used in washing the wheat from mixing with the wheat passing out of the casing to the spout D. A drum G extends from the casing B. It is open at one end, as shown at H, and closed at the other, as indicated at I, Figs. 1 and 2. A feed-pipe J conveys the water and wheat into this feed-drum G. The interior of the drum at suitable intervals is provided with raised surfaces K, constituting what I term "baffles," which resist the rotary movement of the wheat and water as the same are slushed in a circular direction in the drum by the several feeding-beaters composed of spiral bars or strips L, secured to spiders M, mounted on the main shaft O, which has bearings in the main frame A at P, Q, and R. This shaft is driven by a belt-pulley S.

The shaft O is further provided with three spiders T, each having four arms, which spiders carry conveyers consisting each of a bar U, having spirally-set wings or flights V, which when the shaft is revolved travel in a rotary direction within the straining-drum presently to be referred to. These flights or wings V perform the function of feeding the wheat toward the discharge end of the drum. The centrifugal action of these conveyers also tends to rapidly discharge the water through the straining-drum by centrifugal action and operate to hold the wheat outward, but do not act violently on it. The wings are terminated a sufficient distance within the straining-drum to prevent cracking or injuring the wheat. To avoid the liability of the straining-drum to become clogged, I provide what I term "flexible wipers," shown at W and consisting of short arms pivoted to the bars U and having rubbing or wiping surfaces X, of metal, rubber, or other suitable material. The centrifugal force causes these wipers to rub against the inside of the straining-drum and keep it wiped off clean and free from accumulations.

The main shaft O also carries two drum-spiders 2 and 3, loosely mounted thereon and having secured to them a conical or tapering perforated straining-drum 4. The spider 2 has a ring or annulus 5, with a V-shaped periphery matching the V-shaped edge of the partition E, to which it closely fits to form a joint substantially water-tight. The spider 2 has a sleeve 6, on which is mounted a gear-wheel 7, meshing with a gear-wheel 8, mounted on a counter-shaft 9, also supported in bearings carried by the main frame A. The shaft 9 has also a gear-wheel 10, slightly larger in diameter than the gear-wheel 8, which gear-wheel 10 meshes with a gear-wheel 11, mounted on the main shaft O, but somewhat smaller than the gear-wheel 7. Thus when the shaft O is driven by the pulley S the feeding-agitators are revolved at the speed of the shaft and the straining-drum is revolved at a slightly lower speed through the gears described. Thus the feeding-agitators and the straining-drum travel at differential speeds, though in the same direction. The effect of this is to thoroughly eject the water and yet prevent injury to the wheat.

The operation and utility of my machine will be understood and appreciated by the following when taken in connection with the foregoing description: As before stated, the wheat and water are fed through the pipe J into the feed-drum G, where it is thoroughly washed by the action of the feeding-beaters L and baffles K. Passing into the straining-drum, the wheat is conveyed through the drum, while the water is separated from the wheat by centrifugal force and each discharged through separate openings and pipes, and while also the interior of the straining-drum is kept free from accumulations which would tend to clog it up by the action of the yielding scrapers.

Having thus fully described my invention, what I claim as new, and desire to secure by Letters Patent, is—

1. In a wheat-washing machine, the combination with a casing having a partition, a feed-drum with a feed-pipe through which the commingling wheat and water feed, and a conical straining-drum in the casing with the smaller end next to said feed-drum and discharging at its lower end beyond said partition, whereby the wheat travels downward, of a main shaft with feeding-beaters in the feed-drum, spiders fixed on said shaft and in the straining-drum, and having bars substantially in line with the wall of said drum and flighted wings secured to said bars, other spiders mounted to rotate on said shaft independently of it and carrying said straining-drum, and an annulus matching the said partition, which together divide the discharging wheat and water and a sleeve extending from said independent spiders, a gear on said sleeve and a gear on said shaft of different diameters, and driving-gears therefor.

2. In a wheat-washing machine, the combination with a shaft, a set of spiders fixed thereto and other spiders independently rotatable thereon, bars carried by the fixed spiders and each bar having fixed flighted wings, and pivoted wipers, and a straining-drum carried by the independently-rotatable spiders, said drum being conical and discharging at its larger end, a gear on the shaft, another gear of a different size connected with the independently-rotatable spiders.

3. In a wheat-washing machine, the combination with a casing and a fixed partition therein occupying a crosswise position, the casing having a wheat-opening at one side of the partition and a water-opening at the other side, of a rotatable shaft in the casing and a conical rotatable straining-drum mounted upon the shaft and having an annulus at its larger end matching with the partition so that the grain from said drum will pass to one side of said partition and the water dropping from the drum will collect at the other side.

4. In a wheat-washing machine, the combination with the straining-drum, and a shaft running therethrough, the drum being rotatable at one speed, and the shaft at another, spiders fixed to the shaft and bars fixed to the spiders, and pivoted wipers carried by the bars and adapted by centrifugal force to swing outward and rub the inside of the drum, said drum being conical so that the wheat travels down an incline while being acted on and discharged by said spiders and wipers.

In testimony whereof I affix my signature in presence of two witnesses.

JAMES McDANIEL.

Witnesses:
HENRY H. ROBINSON,
CHAS. C. BOVEY.